March 8, 1927.
E. A. DE WATERS
1,619,972
TRANSMISSION LOCK FOR MOTOR VEHICLES
Filed Dec. 13, 1922
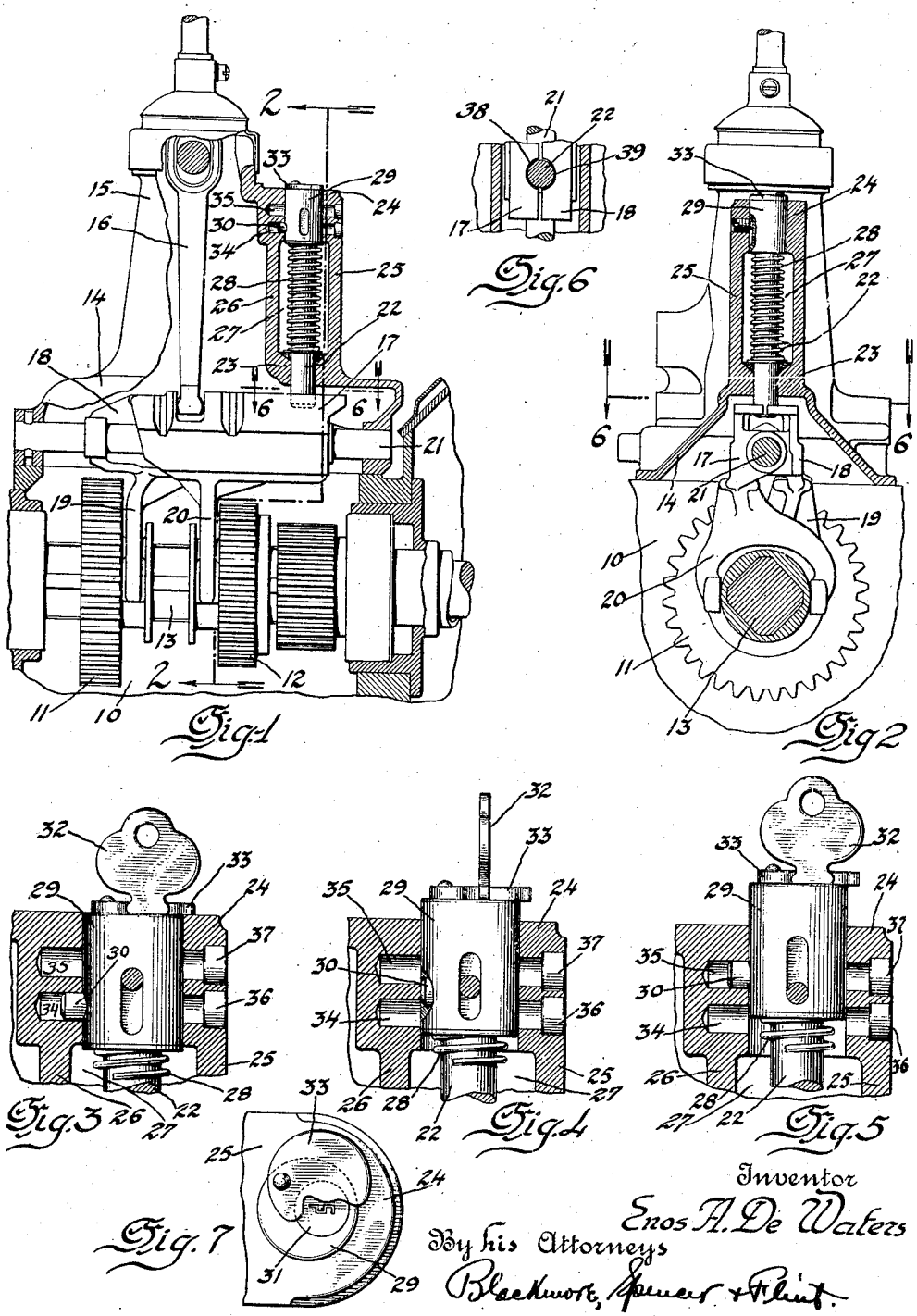
Inventor
Enos A. De Waters
By his Attorneys
Blackmore, Spencer & Flint Patented Mar. 8, 1927.

1,619,972

UNITED STATES PATENT OFFICE.

ENOS A. DE WATERS, OF FLINT, MICHIGAN, ASSIGNOR TO GENERAL MOTORS CORPORATION, OF DETROIT, MICHIGAN, A CORPORATION OF DELAWARE.

TRANSMISSION LOCK FOR MOTOR VEHICLES.

Application filed December 13, 1922. Serial No. 606,711.

My invention relates to locking devices for motor driven vehicles to prevent theft thereof or operation by unauthorized persons, and particularly to locking devices of the type, class or kind wherein the locking mechanism is associated with the change speed transmission gearing of the vehicle, and acts to lock gear shifting members thereof against movement, said members being commonly locked in a neutral position with no driving gears in mesh so that the vehicle may be moved about by hand, as is usually required by police and fire regulations.
The principal object of my invention is to provide locking mechanism of the type above referred to and wherein the immediate locking member is associated with the cover of the transmission gearing casing in an improved manner; and wherein a stronger and a more conveniently operable locking mechanism, and one which is simpler in construction and less expensive to manufacture than heretofore, is secured.
A further object of my invention is to provide improved locking mechanism of the class or type described and wherein the immediate locking member is locked (by means of a key operated bolt) in both its locking and in its unlocked position; so that in addition to the function performed by said member in locking the gear shifting members against movement said member is locked out of action, and cannot be accidently or unintentionally moved into its locking position without the use of the key of the mechanism. This prevents the operation of the device either to lock or to unlock except by use of the key, and prevents the annoyance incident to chance operation of the locking member (which is located near the feet of the operator) when for example the locking of the vehicle is considered unnecessary, and the operator is driving without having the key to the device upon his person.

With the above and other objects of invention in view my invention consists in the improved locking mechanism or device for motor driven vehicles illustrated in the accompanying drawing and hereinafter described and claimed; and in such variations and modifications thereof, within the scope of the concluding claim, as will be obvious to those skilled in the art to which my invention relates.

In the drawing accompanying and forming a part of this specification and wherein the preferred embodiment of my invention is illustrated:

Figure 1 is a fragmentary view in section for the most part upon a vertical central and longitudinally extending plane, showing my invention as applied to change speed transmission mechanism of a type in extensive use.

Figure 2 is a similar view showing a section upon a vertical transverse plane indicated, approximately, by the line 2, 2, Figure 1, looking toward the left.

Figures 3, 4 and 5 are views upon a larger scale showing the key operable locking bolt and its barrel, and various features whereby the locking member is locked in its two positions, in various phases of the operation of the device.

Figure 6 is a fragmentary view taken upon a horizontal plane indicated by the line 6, 6, Figures 1 and 2, looking down.

Figure 7 is a view showing the upper end of the locking member and adjacent portion of the transmission gearing casing in plan.

Referring now to the drawing, the reference numeral 10 designates a portion of a hollow casing of suitable form and within which suitable change speed gears and other elements of the transmission gearing of the vehicle are located, two of said gears being designated by the numerals 11, 12. These gears are slidable upon a shaft 13 of the transmission gearing into and out of mesh with the other gears not shown, the gearing illustrated being of the sliding gear type although my invention, as will hereinafter appear, is equally applicable to transmission gearing in which the change speed gears are in constant mesh and in which driving connections are established and interrupted by the use of suitable clutches.

The open upper end of the casing 10 is closed by a cover 14 having an upwardly extending pedestal portion 15 which supports the usual oscillating gear shifting lever 16 whereby changes in speed at which the vehicle is driven are effected; said lever in the embodiment of my invention illustrated being operatively connected with two reciprocating members 17, 18 having bifurcated yokes 19, 20, the depending arms of which enter grooves provided in the hubs of the gears 11, 12. These reciprocating members whereby changes in speed are brought about may be supported and guided in various ways as, for example, by means of a rod 21 the ends of which are supported in the walls of the cover plate and upon which both said reciprocating members are slidable. While said reciprocating members in the form of transmission mechanism illustrated act to shift sliding gears they may obviously act to operate clutch mechanism in transmission mechanism of the constant mesh type as my invention is in no way concerned with the specific type of change speed gearing with which it is used.

The reference numeral 22 designates a vertically movable locking member the lower end of which is restrained and guided by a guide 23 located closely adjacent the reciprocating members 17, 18; and the upper end of which is similarly guided by an upper guide or bearing 24 in alignment with and spaced a considerable distance above said lower guide. Both said guides are formed in a housing portion 25 projecting from the cover plate, or perhaps more properly from the pedestal portion 15 thereof; the cover plate, the pedestal and the housing being preferably formed as a single casting as shown. The housing portion is partitioned off from the interior of the pedestal by a vertically extending partition 26 whereby a closed chamber 27 surrounding the locking member, and extending between the guides aforesaid, is provided; and within which chamber a coil spring 28 through which the locking member extends, and whereby said member is forced upward, is housed. This construction prevents oil within the transmission casing and which is splashed about by the gearing therein from working upward around the locking member 22 and out through the upper guide 24 and onto the exterior surface of the cover about the lock; a suitable gasket or packing being commonly provided at the lower guide 23 to prevent the entrance of oil into the chamber 27 through which the locking member extends.

The lower end of the locking member 22 is adapted to accomplish the locking of the reciprocating members 17 and 18 to thereby prevent the operation of the change speed gearing through the lever 16. As shown these members have portions which move alongside and close to one another and in which, as best shown in Figure 6, recesses 38, 39 are provided which recesses (usually when the gearing is in a neutral condition and driving therethrough is interrupted) come opposite one another and beneath the lower end of the locking member; so that said lower end upon the locking member being depressed will enter the opening formed by the two recesses, and lock the members 17, 18 against longitudinal movement.

The locking member 22 is pressed upward by the spring 28 acting between the guide 23 and an enlarged head 29 of said member, as above pointed out, and which head fits within the upper bearing 24 aforesaid. This head is bored out to provide a cylindrical recess which contains the rotatable locking element per se of the device; the same comprising a transversely movable bolt 30 which is moved in and out along a passage in the head by an oscillating or rotary locking barrel 31 slotted to receive the key 32, and having pin or tumbler elements of any desired form or type for restraining movement of the barrel and preventing operation of the bolt except by the use of the key. The upper end of the head 29 is provided with the usual swinging cover 33 for protecting the upper end of the barrel and closing the key hole therein.

Two recesses 34, 35 are formed in the side wall of the upper guide 24 preferably by drilling transversely of the housing and plugging the outer ends of the holes as indicated at 36, 37. The locking bolt 30 may be moved into either one of these recesses by rotating the key and barrel 31 as is usual in locks and, when the locking member 22 is depressed against the spring 28 and the bolt thus operated, the locking member will be locked in its lowermost position with its lower end in the recesses 38, 39, thus preventing movement of the members 17, 18 by the lever 16; this position being shown in Figure 3.

The mechanism is unlocked by moving the bolt 30 to the right, whereupon the spring 28 moves the locking member up and its end out of the recesses aforesaid. When said locking member is in its uppermost position the bolt 30 may be moved into the uppermost recess 35 and the key removed, thus locking the locking member in its uppermost position and preventing accidental or unintentional depression of the locking member at times when the locking mechanism is deemed unnecessary, and it is desired to operate the vehicle with the said mechanism temporarily out of use.

It will be appreciated that the spacing of the bearings 23, 24 a greater distance apart than has heretofore commonly been the case reduces the effect of looseness at the bearings, and permits a longer and a more massive locking member to be employed; while the location of the lower bearing close to the reciprocating members 17, 18 with only the clearance between them necessary to prevent interference provides a construction in which an exceptionally strong holding action is secured. Finally, the housing of the locking member in an extension of the cover of the transmission casing provides a construction in which nothing short of the destruction of the cover would put the locking mechanism out of commission, and defeat its intended operation of preventing the operation of the vehicle by unauthorized persons.

Having thus described and explained my invention, I claim and desire to secure by Letters Patent:

In locking mechanism of the class described and in combination with transmission mechanism comprising a casing, and two reciprocating gear shifting members; a cover for said casing; said cover having a lower guide located adjacent said gear shifting members, an upper guide spaced apart and arranged in alignment with said lower guide, and a partition extending between said guides and providing a closed chamber between them; a locking member movable vertically in said chamber and guides and the lower end of which is adapted to enter recesses provided in said gear shifting members; a single rod carried by said cover and along which both of said gear shifting members are movable; a transversely movable bolt slidable in a passage provided in the upper end of said locking member, and the end of which is arranged so as to enter one or the other of two recesses formed in the upper of said guides, to thereby lock said locking member in both its upper and in its lower positions; and bolt operating means housed within the upper end of said locking member and adapted to operate said bolt.

In testimony whereof, I affix my signature.

ENOS A. DE WATERS.